United States Patent [19]

Zurbuchen et al.

[11] 4,270,236
[45] Jun. 2, 1981

[54] PROCESS FOR THE DYEING OF FIBRE MATERIAL

[75] Inventors: Jacques Zurbuchen, Pratteln; Willi Leutenegger, Bottmingen, both of Switzerland

[73] Assignee: CIBA-GEIGY Corporation, Ardsley, N.Y.

[21] Appl. No.: 693,594

[22] Filed: Jun. 7, 1976

Related U.S. Application Data

[63] Continuation of Ser. No. 551,934, Feb. 24, 1975, abandoned, which is a continuation of Ser. No. 302,697, Nov. 1, 1972, abandoned.

[30] Foreign Application Priority Data

Nov. 9, 1971 [CH] Switzerland ............... 16260/77

[51] Int. Cl.$^3$ .............................................. D06P 7/00
[52] U.S. Cl. .................................... 8/159; 8/500; 8/589; 8/912; 8/932
[58] Field of Search ............... 8/89, 500, 159, 589, 8/912, 932

[56] References Cited

U.S. PATENT DOCUMENTS

| | | | |
|---|---|---|---|
| 1,987,583 | 1/1935 | Berthold | 8/89 |
| 2,460,206 | 1/1949 | Wentz | 8/149.1 |
| 3,134,636 | 5/1964 | Singleton | 8/178 |
| 3,762,866 | 10/1973 | Rayment et al. | 8/149.1 |
| 3,788,807 | 1/1974 | Beiertz | 8/26 |
| 3,790,342 | 2/1974 | Love | 8/173 X |
| 4,198,204 | 4/1980 | von der Eltz | 8/543 |

FOREIGN PATENT DOCUMENTS

| | | | |
|---|---|---|---|
| 772950 | 1/1972 | Belgium | |
| 7110182 | 2/1972 | Netherlands | 8/173 |
| 7112940 | 3/1972 | Netherlands | 8/173 |
| 7743660 | 1/1956 | United Kingdom | 8/173 |

OTHER PUBLICATIONS

Fischer–Bobien, Lexicon Fuer die GeSamte Textilveredlung 1950, p. 189.
Viktorov, Verfabrentechnik der Fasterstaffe 1940, pp. 223–224.
Arbuckle, J. Soc. Dyes & Col, Oct. 1968, No. 10, pp. 497–501.
American Dyestuff Rep., 8/17/53, pp. 540–553.
An Introduction to Textile Printing, pp. 4–7, Pub. 1964 by Butterworths, London, Eng.
Kein, America Dyestuff Rep., 5/15/61, pp. 368–373.

*Primary Examiner*—A. Lionel Clingman
*Attorney, Agent, or Firm*—Edward McC. Roberts

[57] ABSTRACT

An improved process for dyeing of diverse fibre material, especially textile fibres, by applying to the fibre material at a temperature below the absorption temperature of the dyestuffs a concentrated aqueous dye liquor and with a goods to liquor ratio of 1:1.5 to 1:4, the said aqueous dye liquor containing at least one dyestuff which, in the case of the substrate to be dyed, has affinity to the fibres and which is either soluble or dispersible in water and 0.2 to 10 g/l, preferably 2 to 5 g/l, of a non-foaming anionic dispersing agent from the class of aromatic sulphonic acids or the water-soluble salts thereof, and finishing of the dyeing by means of a heat treatment, e.g. introduction of saturated steam, superheated steam or hot air, preferably by heating from without, at temperatures of 95° to 140° C.

8 Claims, No Drawings

PROCESS FOR THE DYEING OF FIBRE MATERIAL

This is a continuation of application Ser. No. 551,934, filed Feb. 24, 1975, now abandoned, which is a continuation of application Ser. No. 302,697, filed Nov. 1, 1972, now abandoned.

The present invention relates to a process for the dyeing of fibre material in concentrated dye liquors with water-soluble or water-dispersible dyestuffs, as well as to the fibre material dyed by the new process.

Processes are known which consist of the continuous dyeing of voluminous textile webs in concentrated dye liquors by the feeding of the webs through a trough filled with dye liquor, or by the impregnation of the said material by means of an overflow, with dye liquor absorptions of ca. 250 to 300% being obtained; and subsequently the fixing of the dyestuff by, for example, steaming with saturated steam. These processes are limited, however, to the dyeing of voluminous webs, particularly carpets.

Moreover, the process has already been suggested wherein fibre material is dyed in concentrated dye liquors containing the dyestuff and at least one foam-forming compound, dyeing being effected by means of a stable microfoam. For example, the material to be dyed is sprayed with dye liquor, and fed into a drum dyeing machine, whereupon an intense foam is produced by a tumbling action, the dyestuff being then fixed by a heat treatment consisting, for example, of the introduction of saturated steam or hot air. But this process too has disadvantages, one particular disadvantage being that relatively large amounts of foam-forming compounds are required, with the removal of these from the dyed material necessitating the application of several washing operations. Furthermore, dyeing in the presence of a stable microfoam can be performed only in a quite specific type of equipment.

A process has now been found which renders possible, in a simple manner and with avoidance of the mentioned difficulties and disadvantages, the obtainment on diverse fibre materials, preferably textile fibres, of excellent dyeings in concentrated dye liquors. This process comprises the application to the fibre material of an aqueous dye liquor at a temperature below the absorption temperature of the dyestuffs and with a goods to liquor ratio of 1:1.5 to 1:4, the said aqueous dye liquor containing at least one dyestuff which, in the case of the substrate to be dyed, has affinity to the fibres, and which is either soluble or dispersible in water, and 0.2 to 10 g/l, preferably 2 to 5 g/l, of a non-foaming anionic dispersing agent from the class of aromatic sulphonic acids or water-soluble salts thereof, and the finishing of the dyeing by means of a heat treatment.

Suitable water-soluble dyestuffs having affinity to fibres or water-dispersible dyestuffs, applicable according to the invention, are the same organic dyestuffs as are normally used in textile dyeing for the dyeing of fibre materials, particularly textile fibres, from an aqueous dye liquor. Depending on the substrate to be dyed, suitable dyestuffs are water-soluble anionic or cationic dyestuffs, or dispersion dyestuffs.

The dyestuffs usable according to the invention can belong to the most diverse classes of dyestuffs. These are, in particular, mono-, dis- or polyazo dyestuffs, formazan, anthraquinone, nitro, methine, styryl, azastyryl or phthalocyanine dyestuffs.

With regard to the water-soluble anionic dyestuffs these are, in particular, the alkali metal salts or ammonium salts of the dyestuffs known as acid wool dyestuffs, of the reactive dyestuffs, or of the substantive cotton dyestuffs of the azo, anthraquinone and phthalocyanine series. Suitable azo dyestuffs are preferably metal-free mono- and disazo dyestuffs containing one or more sulphonic acid groups, heavy-metal-containing, particularly copper-, chromium-, nickel- or cobalt-containing, monoazo, disazo and formazan dyestuffs, and metallised dyestuffs containing bound to one metal atom 2 molecules of azo dyestuff. Anthraquinone dyestuffs to be given particular mention are 1-amino-4-arylamino-anthraquinone-2-sulphonic acids, and in the case of phthalocyanine dyestuffs, particularly sulphated copper phthalocyanines or phthalocyaninearylamides.

As reactive dyestuffs containing sulpho groups mention may be made of water-soluble dyestuffs of the azo, anthraquinone and phthalocyanine series containing at least one fibre-reactive group, e.g. a monochlorotriazinyl, dichlorotriazinyl, dichloroquinoxalinyl, trichloropyrimidinyl, difluorochloropyrimidinyl, $\alpha$-bromoacrylamide group or the $\beta$-oxyethylsulphuric acid ester group.

In the case of the water-soluble cationic dyestuffs, these are the usual salts and metal halide double salts, e.g. zinc chloride double salts, of the known cationic dyestuffs, especially the methine, azomethine, or azo dyestuffs which contain the indolinium, pyrazolium, imidazolium, triazolium, tetrazolium, oxdiazolium, thiodiazolium, oxazolium, thiazolium, pyridinium, pyrimidinium or pyrazinium ring. Also suitable are cationic dyestuffs of the diphenylmethane, triphenylmethane, oxazine and thiazine series, and, finally, also dye salts of the arylazo and anthraquinone series with an external onium group, e.g. an external cyclammonium group or alkylammonium group.

Concerning the dispersion dyestuffs, these are especially azo dyestuffs, as well as anthraquinone, nitro, methine, styryl, azostyryl, naphthoperinone, quinophthalone or naphthoquinoneimine dyestuffs. These difficultly water-soluble dyestuffs form in the finely-ground condition, with the aid of dispersing agents, very fine aqueous suspensions.

The process according to the invention is suitable also for the optical brightening of undyed textile materials with dispersion brighteners, and particularly with water-soluble anionic and cationic optical brighteners. These can belong to any desired classes of brighteners. They are, in particular, stilbene compounds, coumarins, benzocoumarins, pyrazines, pyrazolines, oxazines, dibenzoxazolyl or dibenzimidazolyl compounds, as well as naphthalic acid imides.

The amounts in which the dyestuffs are used in the dye baths can vary, depending on the desired depth of colour, within wide limits; in general, amounts of 0.001 to 10 percent by weight, relative to the material to be dyed, of one or more dyestuffs have proved advantageous.

The cationic dyestuffs are employed, for example, for the dyeing of fibre materials made from polyacrylonitrile, modified synthetic polyesters or polyamides, cellulose-2½-acetate, cellulose triacetate and silk; the anionic acid dyestuffs, metal-complex dyestuffs, substantive and reactive dyestuffs for the dyeing of fibre materials made from natural or regenerated cellulose, such as cotton, spun rayon and Rayon, natural polyamides such as wool and silk, synthetic polyamides such as polyhexamethylenediaminoadipate, poly-ε-caprolactam or poly-ω-aminoundecanoic acid, and polyurethanes; and the dispersion dyestuffs for the dyeing of fibre materials made from synthetic polyesters such as polyethylene glycol terephthalate, polycyclohexanedimethyleneterephthalate, cellulose triacetate, polyacrylonitrile, synthetic polyamides, polyurethanes and polyolefins.

The process according to the invention has proved particularly satisfactory for the dyeing of mixtures of these fibre types with a mixture of the dyestuffs suitable for the substrates to be dyed; for example, mixtures of polyacrylonitrile/spun rayon, polyester/cotton, polyester/spun rayon, polyamide/spun rayon, polyamide/cotton, cellulose-2½-acetate/spun rayon, cellulose-triacetate/spun rayon, polyacrylonitrile/polyester, and especially polyester/wool.

The fibre materials can be in the most diverse stages of processing; e.g., they may be in the form of fabrics, knitwear, yarns, ready-made articles, knitted goods, fibre fleece materials, textile floor coverings such as woven, tufted or felted carpets.

Non-foaming anionic dispersing agents usable according to the invention are aromatic sulphonic acids, thus e.g., benzene or naphthalene monosulphonic acids or their water-soluble salts. Alkylbenzene or alkylnaphthalene sulphonic acids having a straight or branched chain alkyl radical containing at most 4 carbon atoms or cycloalkyl-substituted benzene sulphonic acids, e.g. methyl, ethyl, propyl, isopropyl or tert.butyl benzene sulphonic acid, dimethylbenzene sulphonic acid, 1-methyl- or 1-isopropyl-naphthalene-2-sulphonic acid, and mainly tetrahydronaphthalene sulphonic acids, preferably β-tetrahydronaphthalene sulphonic acid, or a mixture of α- and β-tetrahydronaphthalene sulphonic acid, are particularly effective.

Preferred because they produce particularly good colour yields are non-foaming water-soluble condensation products from 1 to 2 equivalents of formaldehyde or compounds giving off formaldehyde such as trioxymethylene and 2 equivalents of an aryl sulphonic acid or a mixture of such aryl sulphonic acids usable according to the invention. They are obtained, for example, by one of the processes described in German Pat. No. 292,531. Examples of aryl sulphonic acids are, in particular, aryl monosulphonic acids such as benzene, toluene, xylene, naphthalene, methyl naphthalene, tetrahydronaphthalene or diphenyl-naphthyl-methane mono sulphonic acid. The best results from this class of compounds are attained with condensation products from 2 equivalents of tetrahydronaphthalene sulphonic acid, xylene sulphonic acid, and, particularly, naphthalene sulphonic acid or diphenyl-naphthylmethane sulphonic acid or mixtures of toluene or xylene sulphonic acid and naphthalene sulphonic acid and 1 to 2, preferably 1.1 to 1.7 equivalents of formaldehyde.

Particularly suitable are tetrahydronaphthalene sulphonic acid and especially condensation products from 2 equivalents of naphthalene sulphonic acid and 1.4 equivalents of formaldehyde or from 2 equivalents of diphenyl-naphthylmethane sulphonic acid and 1.1 to 1.2 equivalents of formaldehyde, e.g. dinaphthyl-methane disulphonic acids, such as the disodium salt of di-(6-sulphonaphthyl-2)-methane.

These sulphonic acids are generally used in the form of their water-soluble salts, particularly their alkali metal or ammonium salts, but also their alkyl and hydroxyalkyl ammonium salts, such as lithium, potassium, sodium, ammonium, β-hydroxyethyl- or bis-(β-hydroxyethyl)-ammonium salts.

If necessary, the dyestuff liquor can contain further components such as acids, especially an organic, lower aliphatic monocarboxylic acid, e.g. formic or acetic acid; sodium hydroxide; salts, such as ammonium sulphate, sodium sulphate, sodium carbonate or sodium acetate; wetting agents, such as nonylphenoldecaethylene glycol ether or sodium dioctylsulphosuccinate; and/or carriers, e.g. based on o-phenylphenol, trichlorobenzene or diphenyl.

For the preparation of dye liquors, it is advantageous to commence with aqueous dyestuff solutions or dyestuff dispersion, and to then add to these the suitable aromatic sulphonic acids defined.

The process according to the invention is preferably performed in closed, optionally pressure-tight containers, e.g. in circulation equipment such as cheese dyeing machines or beam dyeing machines, jet machines, winch dyeing machines, drum dyeing machines, open vats, or in paddle- or jig-dyeing machines. The process can be carried out, for example, as follows: The dye liquor and the material to be dyed are transferred, with a goods to liquor ratio of 1:1.5 to 1:4, preferably 1:1.5 to 1:2.5, or the material impregnated with the given goods to liquor ratio or advantageously sprayed, at a temperature below the absorption temperature of the dyestuffs, advantageously at 20° to 40° C., to the container; the dye liquor is then evenly distributed on the fibre material, below the absorption temperature of the dyestuffs, optionally by mechanical movement; and the temperature of the dye bath subsequently raised, by the introduction of saturated steam, superheated steam or hot air, advantageously however by heating from without, within 15 to 30 minutes to 95° to 140° C., advantageously to 98° to 105° C.; and this temperature maintained for ca. 15 to 120 minutes, advantageously for 20 to 45 minutes, until the dye liquor is exhausted. The dye bath is then cooled and the dyed material removed from the bath; the bulk of surplus dye liquor is separated from the material by squeezing, and the dyed fibre material, optionally after rinsing with warm water, dried. By virtue of the high degree of bath exhaustion and the small amounts of anionic dispersing agent, a subsequent cleansing of the dyed material is in most cases unnecessary.

Compared with known processes, the process according to the invention has noticeable advantages. The main advantages are that the dyestuffs are practically completely absorbed, that only small migration of the dyestuffs occurs, and that, within shorter dyeing times than usual, deeply coloured, even and non-streaky dyeings well dyed throughout are obtained. According to the present invention, deeply coloured dyeings are obtained with extremely small amounts of water, and hence with practically no accumulation of contaminated water, and without dyeing being performed in the presence of a stable microfoam, the obtained dyeings being to a great extent free from sandwich effects.

The following examples serve to illustrate the invention. Temperatures are expressed in degrees Centigrade.

EXAMPLE 1

An amount of 0.9 g of the dyestuff of the formula

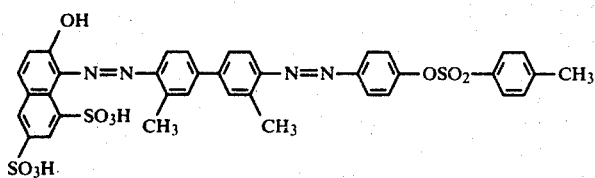

is dissolved in 90 ml of hot water; additions are then made to the solution of 0.5 g of the disodium salt of di-(6-sulphonaphthyl-2)-methane and 0.2 ml of acetic acid (80%), and the whole made up by the addition of water to 100 ml. After cooling to room temperature, the dyestuff solution is transferred together with 66 g of polyamide-6.6-tricot in the rolled-up state, to a metal container such as is employed for the dye baths of the equipment of the firm Callebaut de Blicquy, Brussels; the container is thereupon sealed and thoroughly shaken. The container is then maintained in continuous movement in the dyeing apparatus in the usual manner; the bath temperature is raised within 15 minutes from 20° to 100°, and then held at this temperature for 30 minutes. After cooling, the dyed fabric is removed, and then squeezed out to leave as little moisture as possible in the material; it is subsequently rinsed by heating with water, with a goods to liquor ratio of 1:2, in the above described container for 5 minutes, and finally dried.

An even, non-streaky, brilliant red dyeing is obtained which is excellently dyed throughout, and which has very good fastness to wet processing and to light.

EXAMPLE 2

If, instead of the dyestuff given in Example 1, 1.5 g of the 1:2-chromium complex of the dyestuff of the formula

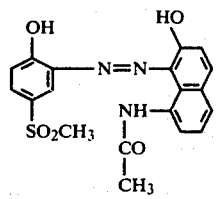

is used, and instead of 66.6 g of polyamide-6.6-tricot 66.6 g of wool flannel, the procedure being otherwise as described in Example 1, then a dark-grey even wool dyeing is obtained well dyed throughout and possessing good fastness to wet processing and to light. The small amount of dye liquor remaining after dyeing is colourless.

If, instead of 0.5 g of the disodium salt of di-(6-sulphonaphthyl-2)-methane in the above example, 0.5 g of the sodium salt of tetrahydronaphthalene sulphonic acid, 0.2 g of a mixture of the β-hydroxyethylammonium salt of α- and β-tetrahydronaphthalene sulphonic acids or 0.3 g of the condensation product of 2 mols diphenyl-naphthyl-methane sulphonic acid and 1.2 mols of formaldehyde is added, the procedure being otherwise the same as described in Example 2, then there are likewise obtained even dark-grey wool dyeings well dyed throughout.

Said diphenyl-naphthyl-methane sulphonic acid may be obtained by condensing 1 mol naphthalene and 0.1 to 3 mols of diphenylpolymethylenechloride dissolved in 1 to 3 mols of sulphuric acid at a temperature of 100° to 180° and neutralization of the acid with aqueous sodium hydroxide solution.

If, instead of the dyestuff given in Example 2, 0.6 g of the dyestuff of the formula

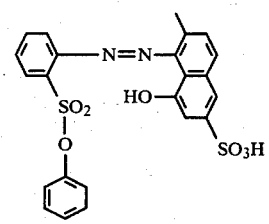

or 0.6 g of the dyestuff of the formula

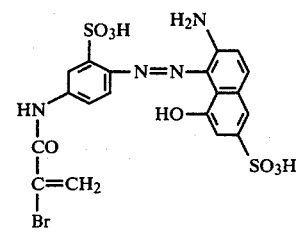

is used, in procedure being otherwise as described in Example 2, then there is obtained a red wool dyeing well dyed throughout and possessing fastness to light and to wet processing.

EXAMPLE 3

An amount of 1.3 g of the dyestuff of the formula

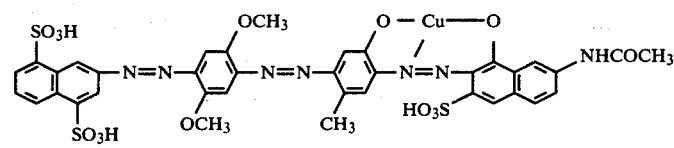

is dissolved in 90 ml of hot water; additions are then made to the solution of 0.5 g of the disodium salt of di-(6-sulphonaphthyl-2)-methane, 0.05 g of nonylphenol decaglycol ether and 0.5 g of sodium sulphate, and the liquor made up to 100 ml by the addition of water. After cooling to room temperature, the dyestuff solution is transferred together with 66.6 g of cotton fabric to a metal container such as is described in Example 1. With otherwise the procedure as given in Example 1, there is obtained an evenly dyed dark-grey cotton fabric which is well dyed throughout and possesses good fastness to wet processing and to light.

If, instead of 0.5 g 0.2 g of the disodium salt of di-(6-sulphonaphthyl-2)-methane or 0.3 g of the condensation product of 2 mols diphenyl-naphthyl-methane sulphonic acid and 1.1 mols of formaldehyde are used in the above example, the procedure being otherwise as described in the example, then there is likewise obtained an even dark-grey dyeing on cotton fabric well dyed throughout.

EXAMPLE 4

An amount of 0.66 g of the dyestuff of the formula

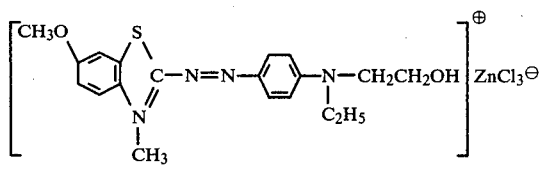

is dissolved in 90 ml of hot water. Additions are made to the obtained solution of 0.5 g of the disodium salt of di-(6-sulphonaphthyl-2)-methane and 0.2 ml of 80% acetic acid, and the solution is then made up by the addition of water to 100 ml. After cooling to room temperature, the dyestuff solution is transferred, together with 66.6 g of a polyacrylonitrile staple fabric (ORLON) in the rolled-up state, to a metal container such as is employed for the dye baths of the equipment of the firm Callebaut de Blicquy, Brussels; the container is thereupon sealed and thoroughly shaken. The container is then maintained in continuous movement in the dyeing apparatus in the usual manner; the bath temperature is raised within 15 minutes from 20° to 100°, and then held at this temperature for 30 minutes. After cooling, the dyed fabric is removed, and then squeezed out to leave as little moisture as possible in the material; it is subsequently rinsed by heating with water, with a goods to liquor ratio of 1:2, in the above described container for 5 minutes, and finally dried.

An even blue dyeing is obtained which is excellently dyed throughout, and which has very good fastness to wet processing and to light.

EXAMPLE 5

An amount of 0.66 g of the dyestuff of the formula

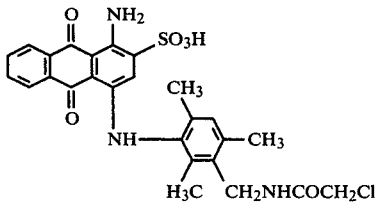

is dispersed in 50 ml of hot water; additions are then made to the dispersion of 0.5 g of the disodium salt of di-(6-sulphonaphthyl-2)-methane, and 0.6 g of carrier consisting of 45 parts of o-phenylphenol, 41 parts of ethylene glycol, 2.5 parts of polyvinyl alcohol, 2.5 parts of dioctylsulphosuccinate and 9 parts of water, dissolved in 50 ml of hot water. After cooling to room temperature, the dyestuff suspension is transferred, together with 33 g of polyethylene glycol terephthalate fabric, to a metal container such as is described in Example 1. If the procedure given in Example 1 is then carried out, an even orange dyeing well dyed throughout is obtained, which possesses the same fastness to wet processing and to light as a corresponding dyeing on polyethylene glycol terephthalate fabric obtained in the usual manner with a goods to liquor ratio of 1:10.

EXAMPLE 6

If, instead of the dyestuff given in Example 1, 0.01 g of the optical brightener of the formula

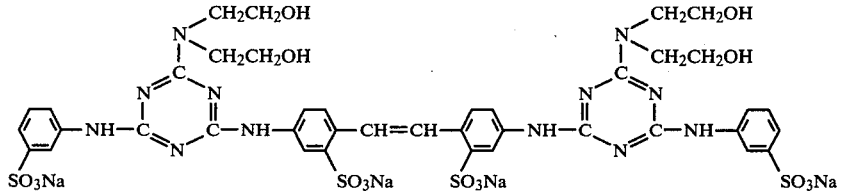

is used, the procedure being otherwise as described in Example 3, then there is obtained an even optically brightened cotton fabric.

EXAMPLE 7

An amount of 0.66 g of the dyestuff mixture consisting of 10 parts of the dyestuff of the formula

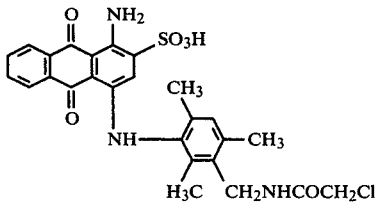

and 60 parts of the dyestuff of the formula

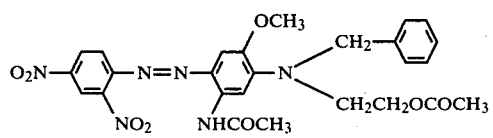

is dissolved in 90 ml of hot water; additions are then made to the dispersion of 0.5 g of the disodium salt of di-(6-sulphonaphthyl-2)-methane and 0.2 ml of acetic acid (80%), and the dispersion made up to 100 ml by the addition of water. The dyestuff dispersion is cooled to room temperature and transferred, together with 66.6 g of a mixed fabric in the rolled-up state, consisting of 67% of polyethylene glycol terephthalate and 33% of wool, to a metal container; the container is sealed and well shaken. The container is then kept in continuous movement, in the usual manner, in the dyeing apparatus corresponding to Example 1; the bath temperature is raised within 15 minutes from 20° to 130° and this temperature maintained for 30 minutes. After cooling, the mixed fabric is removed; it is squeezed out to about 50% moisture content; it is subsequently rinsed with cold water, and then soaped with warm water containing 2 g/l of the addition product of 9 mols of ethylene oxide with 1 mol of nonylphenol.

An even navy blue dyeing well dyed throughout is obtained, with both fibre constituents being uniformly dyed.

EXAMPLE 8

An amount of 10 g of the dyestuff of the formula

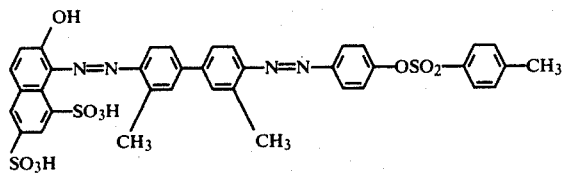

is dissolved in 1500 ml of hot water; additions are then made to the solution of 10 g of the disodium salt of di-(6-sulphonaphthyl-2)-methane and 20 ml of acetic acid (80%), and the whole made up by the addition of water to 2000 ml. After cooling to room temperature, the dyestuff solution is sprayed in atomised form by means of a volumetric gear under a pressure of 25 atmospheres to pullovers rotating continuously in a drum at room temperature with a rotary speed of 25 revolutions per minute, the said pullovers being made from polyamide-6.6 and having a total weight of 1000 g. After completion of the atomisation spraying process, the indirect heating is switched on, with the drum still rotating, and by addition of 1000 ml of water to the bottom of the drum and evaporation of the water, an immediate formation of saturated steam in the drum is obtained, whilst the temperature is allowed to rise to 98°. Within 10 minutes there is produced in this manner a saturated steam atmosphere of 98° and this then maintained for 20 minutes. The dyed material is subsequently cooled to a temperature of 70° and then centrifuged in the dyeing drum until a residual moisture content of about 50% on the fibre is obtained. An amount of 2000 ml of water is thereupon applied by atomisation to the rotating dyed textile material. After completion of this atomisation washing treatment, the dyed material is centrifuged and afterwards dried with hot air at about 100°.

An even, non-streaky, brilliant red dyeing is obtained on pullovers made from polyamide-6.6 well dyed throughout and possessing good fastness properties.

EXAMPLE 9

An amount of 1.3 g of the disodium salt of copper phthalocyanine disulphonic acid is dissolved in 90 ml of hot water; additions are then made to the solution of 0.5 g of the disodium salt of di-(6-sulphonaphthyl-2)-methane and 0.8 g of sodium sulphate, and the liquor made up to 100 ml by the addition of water. After cooling to room temperature, the dyestuff solution is transferred together with 66.6 g of cotton fabric to a metal container such as is described in Example 1. With otherwise the procedure as given in Example 1, there is obtained an evenly dyed turquoise cotton fabric which is well dyed throughout and possesses good fastness to wet processing and to light.

We claim:

1. A batch process for dyeing fiber material comprising the steps of first applying to the fiber material a non-thickened aqueous dye liquor, consisting essentially of
    (a) a water-soluble or water-dispersible dyestuff having affinity for the fiber material
    (b) 0.2 to 10 g/l of a non-foaming anionic dispersing agent selected from the group consisting of benzene monosulfonic acid, naphthalene monosulfonic acid, $C_1$–$C_4$-alkyl benzene monosulfonic acid, $C_1$–$C_4$-alkyl naphthalene monosulfonic acid, tetrahydro naphthalene sulfonic acid, dinaphthylmethane disulfonic acid, diphenyl-naphthylmethane sulfonic acid, a 2:1 to 2:2 adduct thereof with formaldehyde, and water-soluble salts thereof, and
    (c) water,
at a goods-to-liquor ratio of 1:1.5 to 1:2.5 and at a temperature below the absorption temperature of the dyestuff, subsequently in a closed container subjecting the fiber material and applied aqueous dye liquor to shaking or tumbling in a rotating drum sufficient to distribute evenly the aqueous dye liquor on the fiber material while still maintaining the temperature below the absorption temperature of the dyestuff, and finally heating the fiber material and the evenly distributed aqueous dye liquor to exhaust the dyestuff onto the fiber material.

2. The process of claim 1, wherein the dispersing agent is used at a concentration of 2 to 5 g/l.

3. The process of claim 1, wherein the dispersing agent is a formaldehyde adduct of benzene monosulfonic acid, naphthalene monosulfonic acid, $C_1$–$C_4$-alkyl benzene monosulfonic acid, $C_1$–$C_4$-alkyl naphthalene monosulfonic acid, β-tetrahydro naphthalene sulfonic acid, dinaphthalene methane disulfonic acid, or diphenyl naphthalene methane sulfonic acid, having an arylformaldehyde ratio of 2:1.1 to 2:1.2, or a water-soluble salt thereof.

4. The process of claim 1, wherein the dispersing agent is the disodium salt of di-(6-sulfonaphthyl-2)-methane.

5. The process of claim 4, wherein the dispersing agent is used at a concentration of 2 to 5 g/l.

6. The process of claim 1, wherein the aqueous dye liquor and fiber material is heated in the final step at a temperature in the range of 95° to 140° C.

7. The process of claim 6, wherein the heating is effected by the introduction of saturated steam, super heated steam, or hot air.

8. The process of claim 1, wherein the fiber material and applied aqueous dye liquor are shaken or tumbled in a rotating drum to evenly distribute the aqueous dye liquor on the fiber material.

* * * * *